United States Patent Office 3,499,499
Patented Mar. 10, 1970

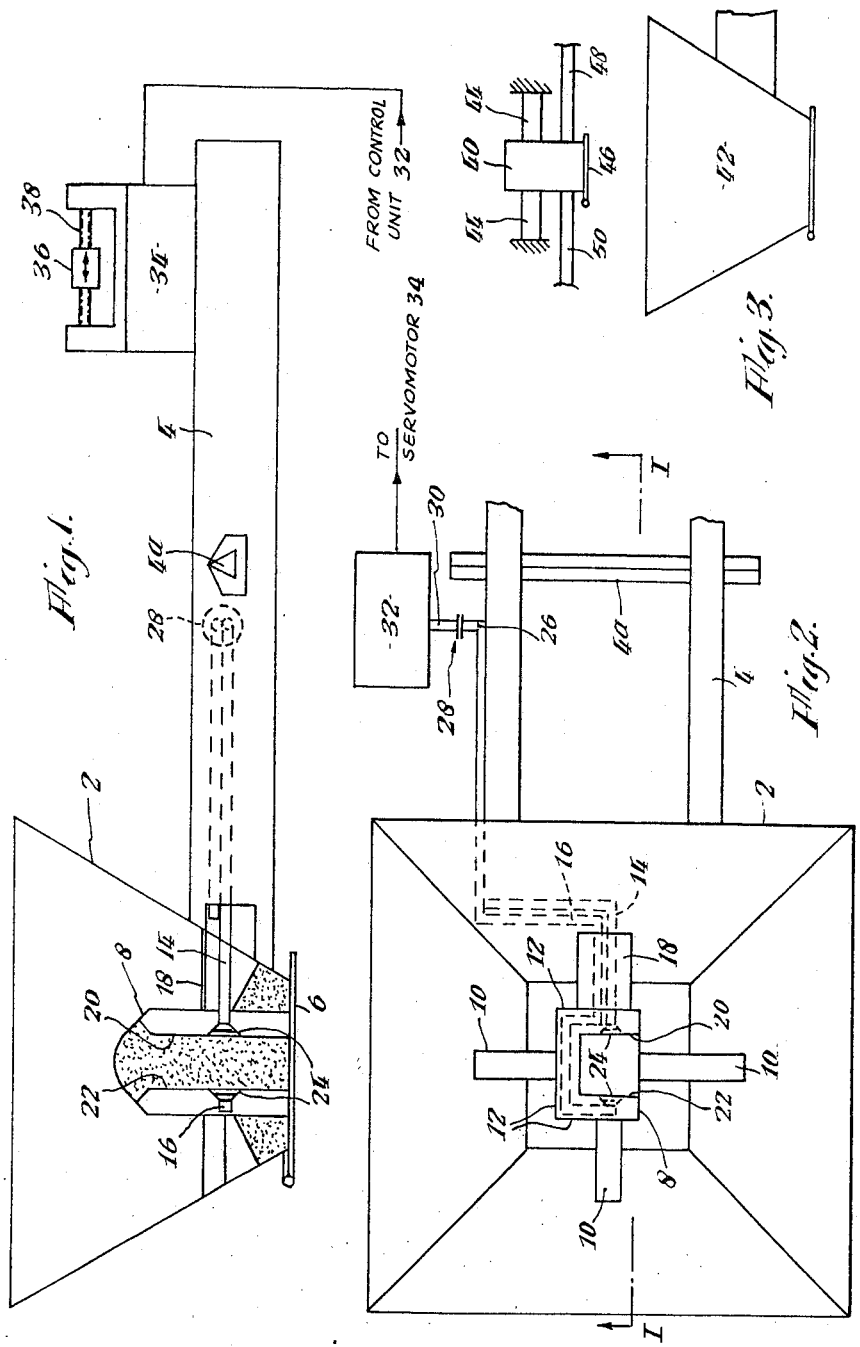

3,499,499
WEIGHING OF MATERIALS WITH MICROWAVE TESTING OF MOISTURE CONTENT
Jack Bilbrough, Newcastle-upon-Tyne, England, assignor, by mesne assignments, to The Bank Organization Limited, Millbank, London, England, a British company
Filed Oct. 11, 1967, Ser. No. 674,576
Claims priority, application Great Britain, Oct. 20, 1966, 47,008/66
Int. Cl. G01g *13/00*
U.S. Cl. 177—64                                9 Claims

ABSTRACT OF THE DISCLOSURE

The specification discloses a batch weighing apparatus in which a portion of the material in a weighing hopper or in passage to such a hopper has its moisture content measured by attenuation of a microwave beam. The beam attenuation is employed to make a trimming adjustment in the batch weighing operation so that the dry material content of respective batches is rendered uniform independently of possible variations in the moisture content of the batches.

---

This invention relates to means for and a method of the batch weighing of materials such as sand, cement, cereals and like solids in flowable form.

When batches of a material are being apportioned by weighing, a difficulty may arise from the presence of varying amounts of moisture in different batches. If the total weight of each batch is kept uniform, variations in moisture content will produce variations in the dry weight of each batch.

The present invention is concerned with the provision of a means for compensating for such variations so that batches having a uniform dry weight can be apportioned independently of the material moisture content at the time of weighing and according to the invention, a batch weighing apparatus for solid materials in flowable form comprises a weighing hopper and a sample receiver of smaller volume than said hopper located within the plan area of the hopper and above the hopper base to receive a portion of the batch of material to be weighed in the hopper, a waveguide being arranged to direct microwave energy through said receiver and detection means being provided to receive the microwave energy after passage therethrough to measure its attenuation by the material in the interior of the receiver in order to provide an indication of the moisture content of said material, there being means actuable by said detection means measurement for adjustment of the amount of material in the batch being weighed to compensate for the moisture content of the batch.

Conveniently said adjustment means includes an adjustable weight by movement of which the weight of material in the hopper required to achieve balance of the apparatus is varied.

The receiver may be supported separately above the hopper so that it does not move with the weighing mechanism, a bottom closure member in the receiver being provided to discharge its contents into the hopper. Alternatively, the receiver may be mounted within and be secured to the hopper in which case it can be defined by a tubular enclosure of relatively small volume within the hopper, the material to be weighed being poured into it and the overflow being received into the hopper space surrounding the tubular enclosure. Advantageously, a common bottom closure member is provided for the simultaneous discharge of the contents of both the hopper and the sample receiver.

The invention will be more particularly described with reference to the accompanying drawing, wherein:

FIG. 1 is a sectional elevation of a weigh beam apparatus according to the invention on the line I—I in FIG. 2, FIG. 2 is a plan view of the apparatus in FIG. 1, and FIG. 3 is a part view of a modified hopper and sample receiver for the apparatus of FIGS. 1 and 2.

Referring to FIGS. 1 and 2 of the drawing, hopper 2 in which the material to be weighed is received is mounted on a weigh beam 4 having a pivot support 4a and takes the form of an inverted square-section truncated pyramid, the bottom, smaller end of the hopper being closed by a downwardly hinged door 6. On a central vertical axis within the hopper is an open-ended tube 8 that has its lower end coplanar with the hopper bottom and the interior of which defines a sample receiving space. The tube is smaller in section than the hopper bottom face and it is mounted to the hopper by spider arms 10 between it and the hopper sides.

The tube is of square section and is double-walled on three sides 12. The space between the walls of these sides accommodates inlet and outlet waveguides 14, 16 which are led from a side of the hopper under a protective plate 18 between the hopper and the tube that prevents direct impingement on the waveguides of material poured into the hopper. One of the waveguides 14 passes straight through the thickness of a double wall at one side of the tube to terminate at the inner face 20 of said wall and the other waveguide is led to the opposite inner face 22 of the tube to a terminal position opposite and coaxial with the end of the first waveguide. Said inner faces 20 and 22 may comprise at least in the regions of the waveguide openings a lining of material transparent to microwave frequencies. At the end faces, both waveguides are closed by windows 24, of polystyrene or fused quartz for example, to seal the waveguide interiors from the material being weighed.

Outside the hopper the waveguides are secured to the weigh beam 4 and have terminal portions 26 which extend transversely thereto and end in a common plane perpendicular to the axis of the pivot 4a of the beam. At this plane, non-contacting choke joints 28 are provided to fixed waveguides 30 connected to a microwave control unit 32 which may be of conventional form comprising a microwave energy source coupled to one waveguide and a detector coupled to the other waveguide through a variable attenuator, the detector generating a D.C. output signal in dependence upon the attenuation of the microwaves transmitted to the sample space. At its end remote from the hopper the weigh beam carries a servomotor 34 arranged to adjust a trimmer weight 36 longitudinally of the beam by rotation of a lead screw 38 and it is to the servomotor that the detector electrical output is connected.

In operation, some of the material for a batch is poured into the sample space defined by the tubular receiver 8 which is sufficiently small to ensure that it is completely filled to establish a standard sample head, surplus material then overflowing into the main hopper space. When a microwave signal is passed through the waveguides, it is attenuated by the moisture in the material in the sample space and the current output generated by the detector of the control unit 32 will have a magnitude in dependence upon the degree of attenuation experienced by the microwaves. The servomotor 34 is operated accordingly to move the trimmer weight 36 so as to compensate for the weight of moisture in the material and further material to make up the now adjusted batch weight is added to the hopper to tip the beam. The hopper will then contain material to a given dry weight despite the presence of moisture in the batch.

Discharge of the material is effected by swinging down the hinged door 6 at the bottom of the hopper when both the sample tube and the main hopper space are emptied simultaneously.

It will be appreciated that during tipping of the beam, the joints to and from the fixed waveguides are out of alignment with the waveguides secured to the beam. Appropriate switching means can be incorporated to render the measuring system inoperative at this stage since it will have already completed its function for the batch being handled.

Various modifications of the apparatus are of course possible. It may be mentioned for example, that measurement of the attenuation in the sample space may be by reflected microwave energy, only a single waveguide then being led to the tube. The waveguide or waveguides need not be led along the weigh beam as described above but can be directed along a horizontal axis transversely from a hopper side, parallel to the pivot axis of the beam. Noncontacting choke joints 28 would similarly be provided in this instance. In a case where constriction of movement of the weigh beam or hopper is tolerable, flexible waveguides or rotating joints could be used between the weigh beam and the fixed waveguide or waveguides leading to the microwave control unit.

In the modification illustrated in FIG. 3, the sample receiver 40 is mounted, independently of the weighing hopper 42, to fixed supports 44 so that it does not move with the weigh beam. A hinged door 46 is provided at the bottom of the receiver which is thereby able to accept a sample of the material being loaded into the hopper and to release it into the hopper by opening the door after measurement of the material, moisture content using microwave energy through waveguides 48, 50.

What I claim and desire to protect by Letters Patent is:

1. Batch weighing apparatus for solid materials in flowable form comprising, in combination, a weighing hopper and a sample receiver of smaller volume than said hopper located within an area defined by vertical projection of the hopper periphery and above the hopper base to receive a portion of the batch of material to be weighed in the hopper, a microwave energy source and a detector, waveguide means coupled to said source and detector and leading to said receiver to direct microwave energy from the source to the detector by way of the receiver whereby said detector provides an estimate of the moisture content of the material in the receiver by determination of the attenuation of the microwave energy, weight adjustment means actuable by the detector output to adjust the dry weight of material making up the batch being weighed to compensate for the moisture content thereof.

2. Apparatus according to claim 1, wherein said adjustment means includes a member secured relative to the hopper, a weight movably mounted on the member to be displaceable along said member whereby the weight of material in the hopper required to achieve balance of the apparatus is varied.

3. Apparatus according to claim 1, wherein mounting means for the receiver support it above the hopper and at a spacing therefrom, a displaceable bottom closure member being provided on the receiver to discharge its contents into the hopper.

4. Apparatus according to claim 1, wherein the receiver is mounted with the hopper and is secured to the hopper.

5. Apparatus according to claim 4 wherein the receiver is defined by a tubular enclosure within the hopper, said enclosure having an open upper end.

6. Apparatus according to claim 5 wherein said enclosure is spaced from the inner walls of the hopper.

7. Apparatus according to claim 4 wherein a bottom member forms a common closure for the bases of the hopper and receiver and is displaceable to discharge the contents of both.

8. Apparatus according to claim 1 wherein respective waveguide inlet and outlet openings are provided in opposed walls of the receiver for the transmission of said microwave energy through the receiver, a lining of material that is transparent to microwave frequencies being disposed on the interior walls of the receiver at least in the regions of said openings.

9. A method of weighing a solid material in flowable form using a weighing hopper wherein a portion of the material fed to the hopper is directed through a receiving container to be subjected to the passage of microwave energy therethrough and the attenuation of said energy, which varies with the moisture content of the material, is utilized to adjust the total quantity of material fed to the hopper to compensate for the weight of moisture in the material.

References Cited

UNITED STATES PATENTS

| | | | |
|---|---|---|---|
| 2,968,463 | 1/1961 | Noble | 177—63 |
| 3,079,552 | 2/1963 | Walker. | |
| 3,252,530 | 5/1966 | Bale | 177—63 |
| 3,348,140 | 10/1967 | Godding. | |
| 3,344,877 | 10/1967 | Dietert | 259—154 XR |

FOREIGN PATENTS 674,026  11/1963  Canada.

ROBERT S. WARD, Jr., Primary Examiner

U.S. Cl. X.R.

177—66, 210; 259—154; 324—58.5